Figure 1:
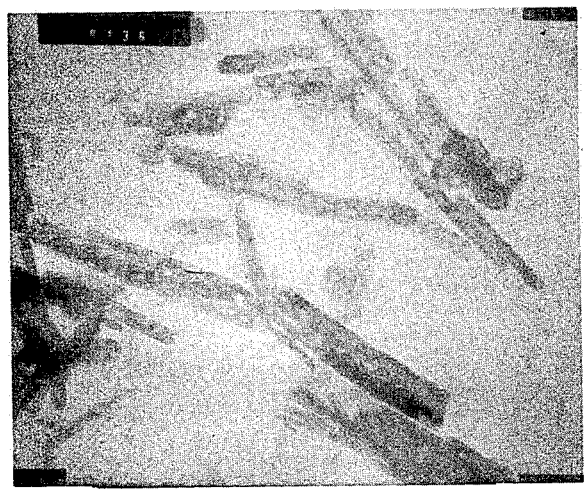

United States Patent [19]

Fagherazzi et al.

[11] 4,096,292

[45] Jun. 20, 1978

[54] PROCESS FOR PREPARING FERRIMAGNETIC ACICULAR FERRIC OXIDE

[75] Inventors: Giuliano Fagherazzi; Francesco Ferrero; Giuseppe Sironi; Bruno Viviani, all of Novara, Italy

[73] Assignee: Montedison S.p.A., Milan, Italy

[21] Appl. No.: 723,303

[22] Filed: Sep. 14, 1976

Related U.S. Application Data

[63] Continuation-in-part of Ser. No. 648,367, Jan. 12, 1976, abandoned.

[30] Foreign Application Priority Data

Jan. 14, 1975 Italy .................................. 19238 A/75

[51] Int. Cl.² .............................................. B05D 5/12
[52] U.S. Cl. ................................ 427/127; 252/62.56; 423/140; 423/634; 427/213; 427/215
[58] Field of Search .................. 423/633, 634, 140; 106/304, 308 B; 427/127, 213, 215; 252/62.56

[56] References Cited

U.S. PATENT DOCUMENTS

| | | | |
|---|---|---|---|
| 3,015,627 | 1/1962 | Ayers et al. | 423/634 |
| 3,075,919 | 1/1963 | Gruber | 423/634 |
| 3,352,638 | 11/1967 | Perlowski et al. | 423/634 |
| 3,503,772 | 3/1970 | Fields | 106/308 B |
| 3,513,007 | 5/1970 | Lederer | 106/308 B |
| 3,545,994 | 12/1970 | Lott et al. | 106/304 |
| 3,591,398 | 7/1971 | Angerman | 106/308 B |
| 3,795,542 | 3/1974 | Halaby et al. | 423/634 |
| 3,845,198 | 10/1974 | Marcot | 423/634 |
| 3,947,502 | 3/1976 | Leitner et al. | 423/634 |

FOREIGN PATENT DOCUMENTS

212,240 12/1968 U.S.S.R. ........................... 423/634

*Primary Examiner*—O. R. Vertiz
*Assistant Examiner*—Wayne A. Langel
*Attorney, Agent, or Firm*—Stevens, Davis, Miller & Mosher

[57] ABSTRACT

A process is disclosed for preparing $\alpha$-$Fe_2O_3$ in the form of acicular particles substantially free from occluded boils or cavities, and containing from 0.2 to 2% by weight of $SiO_2$, and having a mean axial ratio between 6 and 8, and an intrinsic coercive force of 320 – 370 Oe. An aqueous solution of $FeSO_4 \cdot 7H_2O$ is treated with alkali, in the presence of air, thus forming acicular $\alpha$-FeOOH, which is then dehydrated, reduced at $Fe_3O_4$ under fluidizing conditions, and oxidized to $\gamma$-$Fe_2O_3$ at 200°–350° C under fluidizing conditions. The formation of the acicular $\alpha$-FeOOH is carried out at a yield of 0.5–2.5 kg of ferric Fe per hour per m³ of reactor; the reaction product is filtered and washed and the $\alpha$-FeOOH particles are coated with 0.2–2% by weight of $SiO_2$, from an aqueous suspension of $\alpha$-FeOOH brought to a temperature ranging from 50° to 90° C, adding $Na_2SiO_3$, and adjusting the final pH to 5.5–6.5; the $\alpha$-FeOOH treated with $SiO_2$ is dehydrated and simultaneously reduced to $Fe_3O_4$ at a temperature between 480° and 550° C with a gaseous mixture selected from the class consisting of $H_2 + H_2O$, $CO + CO_2$, and $H_2 + CO + H_2O + CO_2$.

6 Claims, 3 Drawing Figures

PROCESS FOR PREPARING FERRIMAGNETIC ACICULAR FERRIC OXIDE

This application is a continuation-in-part of U.S. application Ser. No. 648,367 filed Jan. 12, 1976, and now abandoned.

This invention relates to a process for preparing a ferric oxide having improved magnetic characteristics.

More particularly, it relates to a continuous process for preparing $\gamma$-$Fe_2O_3$ in the form of acicular particles having a high intrinsic coercive force and suitable for utilization in magnetic recording devices such as tapes, discs, cylinders, etc.

PRIOR ART

As is known, $\gamma$-$Fe_2O_3$ can be prepared starting from submicronic acicular particles of $\gamma$-FeOOH, either pure or in admixture with cobalt, by dehydration, reduction to magnetite at 350°–460° C, and successive reoxidation at 200°–450° C. This operation permits one to obtain submicronic acicular particles of $\gamma$-$Fe_2O_3$ having however the drawbacks of exhibiting, in their inside, a considerable amount of boils or cavities, as shown in the accompanying FIG. 1.

Consequently, the coercive force Hc is the lower, the more marked is this type of crystalline defect. For this reason, in practice, intrinsic coercive force values higher than 280 Oersted are not encountered in commercial samples of non-cobalted $\gamma$-$Fe_2O_3$, in the form of particles having a mean axial ratio (length/diameter) ranging from 6 to 8.

It is known too, that it is possible to obtain higher coercive force values by modifying $\gamma$-$Fe_2O_3$ with cobalt. Products of this type, however, are not satisfactory as regards stability when utilized in tapes and other magnetic recording devices, due to the fact that they exhibit very remarkable ageing and instability phenomena as the temperature rises.

OBJECTS OF THE INVENTION

Thus, it is an object of the present invention to provide a process for obtaining an $\gamma$-$Fe_2O_3$ (not modified with cobalt) in the form of submicronic acicular particles completely free from internal boils or cavities, and having a mean axial ratio substantially between 6 and 8, and an intrinsic coercive force not below 320 Oersted.

It has now, surprisingly, been found that the aforesaid and other objects of the invention can be achieved if the following conditions are obtained:

(1) $\alpha$-FeOOH is prepared starting from solutions of $FeSO_4 \cdot 7 H_2O$, under strictly controlled conditions of precipitation;

(2) $\alpha$-FeOOH, before dehydration and reduction, is admixed with $SiO_2$ in an amount equal to 0.2 – 2% by weight; and (3) dehydration of $\alpha$-FeOOH to $\alpha$-$Fe_2O_3$ and reduction of $\alpha$-$Fe_2O_3$ to $Fe_3O_4$ are carried out in one step only, by means of a reducing treatment in a fluidized bed under fluidizing conditions at a temperature ranging from 480° to 550° C.

Thus, it is an object of the present invention to provide a continuous process for preparing $\gamma$-$Fe_2O_3$ in the form of acicular particles, wherein an aqueous solution of $FeSo_4 \cdot 7 H_2O$, kept at 25°-35° C in the presence of air, is trated with alkali until 45 – 55% by weight of the iron, is precipitated in the form of —FeOOH crystallization nuclei and the resulting suspension, at 65°–75° C in the presence of air, is treated with alkali in order to complete the precipitation of iron, thus forming acicular $\alpha$-FeOOH, which is then dehydrated, reduced to $Fe_3O_4$ in a fluid bed reactor under fluidizing conditions and oxidized to $\gamma$-$Fe_2O_3$ at 200°–350° C in a fluid bed reactor under fluidizing conditions, said process being characterized in that:

(a) the formation of the acicular $\alpha$-FeOOH is carried out with a yield of 0.5 – 2.5 kg of ferric Fe per hour per $m^3$ of reactor;

(b) the reaction product is filtered and washed and the $\alpha$-FeOOH particles are coated with 0.2-2% by weight of $SiO_2$, by preparing an aqueous suspension of $\alpha$-FeOOH, bringing the suspension to a temperature ranging from 50° to 90° C, adding $Na_2SiO_3$, and adjusting the final pH to 5.5-6.5;

(c) $\alpha$-FeOOH treated with $SiO_2$ is dehydrated and simultaneously reduced to $Fe_3O_4$ at a temperature between 480° and 550° C with a gaseous mixture selected from the class consisting of $H_2 + H_2O$, $CO + CO_2$, and $H_2 + CO + H_2O + CO_2$.

GENERAL PROCEDURE

When practising the process of the present invention, one may start from an aqueous solution of technical $FeSO_4 \cdot 7 H_2O$ coming, for example, from the production of $TiO_2$ pigment via the sulphate process.

This solution is to be treated in such manner as to obtain $\alpha$-FeOOH in the form of particles having a marked acicular morphology, average longitudinal sizes between 0.4 and 1 $\mu$ strictly dispersed around the mean value (the dispersion is lower than 50%).

This result is attained through strictly controlled precipitation conditions. In particular, the solution is kept in the presence of air and at a temperature ranging from 25° to 35° C. Under these conditions, NaOH or another alkali, such as, for instance, $NH_4OH$, is added in such amount as to cause 45–55% by weight of the iron present in solution to precipitate as $\alpha$-FeOOH, in the form of crystallization nuclei. The final pH of the solution stabilizes at a value between 3.4 and 3.6. The remaining iron is made to precipitate always as $\alpha$-FeOOH, onto said crystallization nuclei by means of further alkali addition and in the presence of air, at a temperature ranging from 65° to 75° C, taking care to adjust the residence time of the suspension in the reactor in such a way as to insure a yield of from 0.5 to 2.5 kg of ferric iron per hour per $m^3$ of reactor volume; i.e., with a feeding flow-rate of $FeSO_4 \cdot 7 H_2O$ of 2.48–12.41 Kg per hour per $m^3$ of reactor.

PREFERRED EMBODIMENT

According to the preferred embodiment of the present invention, the reaction product is filtered, washed, reduced again to a pulp or suspension in water, and added with $Na_2SiO_3$. According to another embodiment of the present invention, the aqueous suspension containing the $\alpha$-FeOOH precipitated, without any filtering and washing, is directly added with $Na_2SiO_3$. In any case the addition is carried out with intense stirring with $Na_2SiO_3$ solution corresponding to an $SiO_2$ content in the dry $\alpha$-FeOOH ranging from 0.2 to 2% by weight, and preferably from 0.5 to 1%. This operation is carried out preferably under hot conditions (50°–90° C), adjusting the final pH of the solution to 5.5 – 6.5 by the addition of inorganic acids or bases (HCl, $HNO_3$, NaOH, $NH_4OH$ ect.). Under these conditions, colloidal SiO$_2$ precipitates and coats the individual particles of α-FeOOH with a protective coating.

After the silicate treatment, filtration and washing with water are carried out until a final S content, on a dry basis, lower than 0.5% by weight, preferably lower than 0.3%, is reached.

The product is dried and granulated, preferably in one operation only, using a spray atomizer so as to obtain granules having a mean diameter ranging from 0.1 to 0.3 mm, and preferably from 0.15 to 0.20 mm, and a moisture content lower than 5% by weight.

The SiO$_2$ addition results in a very thin and uniform surface coating on the α-FeOOH particles, which thus maintain their original acicular form.

The granulated product thus obtained is dehydrated to α-Fe$_2$O$_3$ and reduced to Fe$_3$O$_4$ in one step only, by means of a reducing treatment in a fluidized bed under fluidizing conditions.

Mixtures such as H$_2$+H$_2$O, CO+CO$_2$ or H$_2$+CO+H$_2$O+CO$_2$, optionally diluted with inert gases such as nitrogen, are employed as fluidizing and reducing gases.

The ratios H$_2$/H$_2$O, CO/CO$_2$ or H$_2$ + CO/H$_2$O + CO$_2$ shall be such as to insure the stopping of the reduction with the desired ferrous-ferric oxide Fe$_3$O$_4$, and thus preventing the formation of FeO and/or Fe, which are detrimental.

Generally, the following ranges of values for these ratios are used:

H$_2$/H$_2$O = 0.1 - 4; CO/CO$_2$ = 0.01 - 1; H$_2$ + CO/H$_2$O + CO$_2$ = 0.01 - 4.

The inert gas concentration in the fluidizing and reducing gas mixture may vary from 0 to 95% by volume, and preferably from 70 to 95%.

The reduction is carried out continuously in a fluidized bed reactor, under fluidizing conditions at temperatures between 480° and 550° C, with an average residence time of the solids in the reactor of from 2 to 4 hours.

According to this technology, and starting from α-FeOOH treated with silica as described hereinbefore, a magnetite is obtained whose particles have a morphology and dimensions practically like those of the starting α-FeOOH and substantially free from internal boils or cavities, these conditions being very important in order to obtain a final product having good magnetic characteristics.

The reduced product, continuously discharged from the fluid bed reactor bottom, is continuously fed to another similar reactor where oxidation of magnetite to γ-Fe$_2$O$_3$ takes place. This step is conduced at temperatures between 200° and 350° C, preferably between 280° and 320° C, using air as fluidizing and oxidizing gas, and with an average residence time of the solids in the reactor ranging from 1 to 3 hours.

Figure 2:
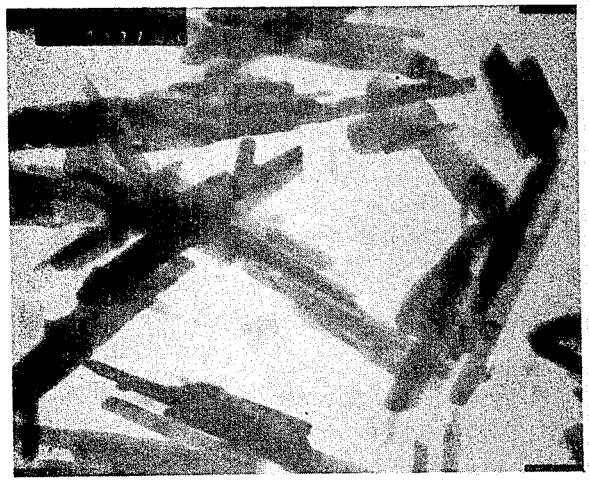

The material discharged from the oxidation reactor is the final product and consists of very crumbly granules from which, by simple disaggregation, and without having recourse to expensive grinding treatments, the submicronic acicular particles of γ-Fe$_2$O$_3$ suitable for successive processing are readily obtained. These particles contain from 0.2 to 2% by weight of SiO$_2$, had have sizes and morphology almost like those of the starting α-FeOOH (mean axial ratio between 6 and 8) and are characterized by the absence of boils or cavities (as clearly appears from the accompanying FIG. 2) and by high magnetic properties:

saturation magnetic moment per mass unit (at romm temperature)

$$\sigma_s = 73 - 77 \text{ emu/g,}$$

intrinsic coercive force H$_c$ = 320 - 370 Oersted.

Magnetic measurements were made by means of a vibrating standard magnetometer of the FONER type, and the $\sigma_s$ measurement was determined in a magnetic field of 10 KOe. The $\sigma_r$ value (residual magnetic induction per mass unit) was determined in a null magnetic field.

These high values of intrinsic coercive force were obtained without employing cobalt, and in consequence the product is characterized by good stability for the intended utility.

These properties could not have been inferred from the prior art. For example, it could not have been predicted that the intrinsic coercive force of γ-Fe$_2$O$_3$ could be raised by treating α-FeOOH with SiO$_2$. In fact, this result is contrary to what is illustrated in the British Patent Specification Number 1,417,505 that suggests coating α-FeOOH with SiO$_2$ in order to reduce the loss in residual magnetization of cobalted γ-Fe$_2$O$_3$ (i.e. for a purpose entirely different from that of the present invention). From the comparative tests reported in the examples of the above German patent application, it clearly suggests that the products obtained starting from SiO$_2$-coated α-FeOOH would have an intrinsic coercive force markedly lower than the products obtained starting from α-FeOOH not coated with SiO$_2$.

From γ-Fe$_2$O$_3$ prepared according to the process of this invention it is possible to obtain, without any grinding, magnetic tapes having the following magnetic properties:

residual magnetization, B$_r$ = 1100 - 1200 Gauss,
saturation magnetization, B$_s$ = 1300 - 1400 Gauss,
ratio: B$_r$/B$_s$ = 0.82 - 0.85
coercivity H$_c$ = 370 - 390 Oe.

Said magnetic tapes are characterized by a particularly flat curve output/frequency; in fact the decrease of output between 1,000 Hertz and 10,000 Hertz is lower than 3 decibel (this is due to the very low amount of cavities or boils inside the acicules and to the homogeneous particle sizes of the product).

In the process according to the present invention it is possible to readily obtain accurate thermal control of the reduction and oxidation steps by using two fluidized bed reactors arranged in cascade and operating continuously. This is very important in that, both in the reduction and in the oxidation step, when it is operated according to conventional techniques (which generally utilize rotary furnaces), local overheatings may occur on the granules, with consequent sintering and worsening of the product. Such overheatings are particularly frequent in the oxidation step, since such reaction is highly exothermic and, moreover, the product coming from the preceding reaction is in most cases pyrophoric.

A further advantage afforded by the process of the present invention is that it is possible to operate in the reduction step at temperatures considerably higher than those usually employed and, in addition, under strictly controlled conditions, thus improving both the structural characteristics (higher closeness of the particles and absence of boils or cavities) and the magnetic characteristics (high coercive force and especially high saturation magnetic moment) without incurring sintering phenomena.

By virtue of the strict thermal control, the product obtained according to the present invention is very crumbling and the elemental acicular particles are easily detachable from one another by simple disaggregation directly during the step of mixing same with the organic binders that are conventionally employed in the preparation of tapes or other magnetic recording devices. Consequently, since the product does not need any grinding it retains the excellent structural and magnetic characteristics originally attained at the conclusion of the process.

DETAILED WORKING EXAMPLES

The following examples are given to illustrate still further the advantages and characteristics of the process according to the present invention.

EXAMPLE 1

Preparation of the $\alpha$-FeOOH nucleus

In a 6 m$^3$ reactor stirred by a 6-blade turbine ($\phi$ 640 mm) and containing 3.77 m$^3$ of 1 molar technical ferrous sulphate solution, 50% of the iron was caused to precipitate by the addition of 0.23 m$^3$ of a soda solution at a concentration of 670 g/l, in 10 minutes at 25° C, while stirring at 110 r.p.m. At the conclusion of the addition of soda, the temperature was 30° C and the pH 7.8. Stirring was increased from 110 to 138 r.p.m., whereupon 40 Nm$^3$/h of air were blown into the reactor, keeping a constant temperature of 34° C for a time-period necessary to arrive at a final pH value of 3.5 (i.e., in the present example, for 11.5 hours).

At the conclusion of oxidation, the liquid in the reactor consisted of about 4 m$^3$ of a slurry containing:

24.2 g/l of Fe$^{++}$ dissolved as FeSO$_4$
26.5 g/l of Fe$^{+++}$(suspended as $\alpha$-FeOOH nuclei.)

Preparation of $\alpha$-FeOOH

A stirred reactor having a capacity of 1 m$^3$ was charged with 377 l of nuclei prepared as described hereinbefore (10 kg of Fe$^{+++}$ equals 15.9 kg of $\alpha$-FeOOH and 9.1 kg of Fe$^{++}$), 289 l of a ferrous sulphate solution at a concentration of 86.1 g/l of Fe$^{++}$ (= 24.9 kg of Fe$^{++}$) and 134 l of water, thereby obtaining a pH value of about 3. This was then heated to 70° C in 60 minutes under stirring at 185 r.p.m. by means of a 6-blade turbine ($\phi$ 300 mm), then a NaOH solution at a concentration of 45% by weight was fed, keeping a constant temperature of about 70° C and blowing in 8 Nm$^3$/h of air, at a flowrate that was self-regulated by the pH existing in the reactor and pre-adjusted at 3.5.

In this example, the time required by the precipitation-oxidation was 42.5 hours, the average consumption of soda solution being 2.2 kg/h and the average yield 0.9 kg of iron per hour per m$^3$.

At the conclusion of the precipitation-oxidation, the liquid in the reactor contained 5 g/l of Fe$^{++}$ dissolved as FeSO$_4$ and 50 g/l of iron suspended as $\alpha$-FeOOH, corresponding to 79.5 g/l of $\alpha$-FeOOH. This was filtered on a Moore filter and the cake was washed with 20 kg of H$_2$O per kg of dry product.

The cake was reduced again to pulp in water in order to obtain a slurry having 12% of solid products (employing 1.5 kg of water per kg of wet cake), and then, under stirring, it was heated to 60° C and 0.037 l of a sodium silicate solution at a concentration of 188 g/l of SiO$_2$ were added per kg of $\alpha$-FeOOH, thereby obtaining a pH = 6.

After stirring for 1 hour at 60° C, it was filtered on a Moore filter and the cake was washed with 20 kg of water per kg of dry product, whereupon it was granulated by means of a spray drier to obtain a granulated product with particle sizes ranging from 0.05 to 0.5 mm.

Dry-conversion of $\alpha$-FeOOH to $\gamma$-Fe$_2$O$_3$

Figure 3:
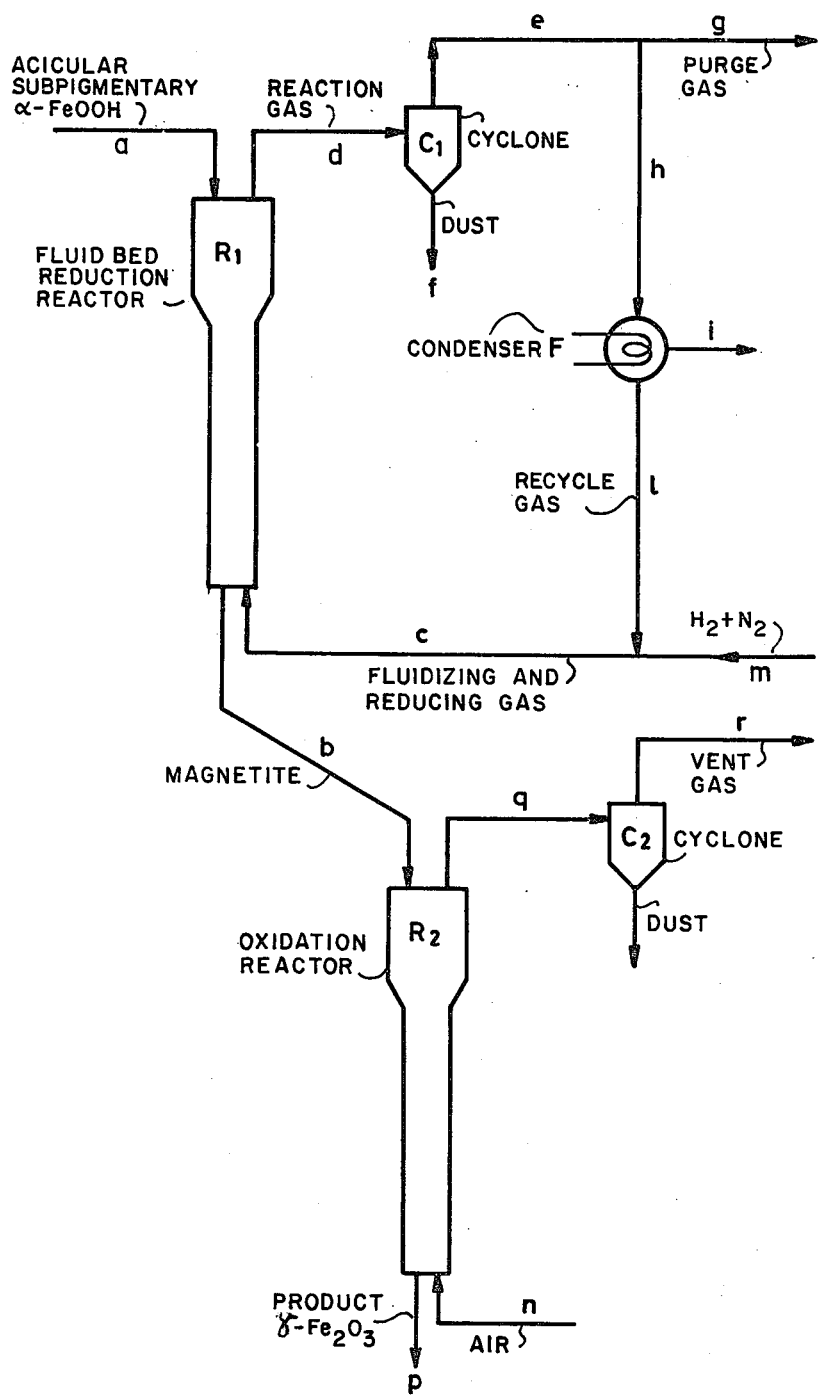

This conversion is illustrated with references to the accompanying flow-sheet of FIG. 3.

Reduction reactor R$_1$ of the fluid bed type ($\phi$ 100 mm) was fed, through $a$, with 0.78 kg/h of acicular subpigmentary $\alpha$-FeOOH, prepared as described hereinbefore, having granule sizes between 0.05 and 0.50 mm, and the following typical composition:

| | |
|---|---|
| Fe$_2$O$_3$ | 86.57% by weight |
| hydroxyl H$_2$O | 9.73% by weight |
| imbibition H$_2$O | 3.00% by weight |
| SiO$_2$ | 0.70% by weight. |

In R$_1$, containing 2.1 kg of solid product, a temperature of 500° C and an expanded bed constant height of about 66 cm were maintained, thereby giving an average residence time of the solid in the reactor equal to about 3 hours.

From the bottom of R$_1$, through $b$, 0.696 kg/h of magnetite were continuously charged and then oxidized in reactor R$_2$.

The fluidizing and reducing gas was sent through $c$ to the reducer (R$_1$) bottom at a flowrate of 2016 Nl/h (6.53% of H$_2$; 0.79% of H$_2$O; 92.68% of N$_2$) obtained by causing to flow, through $l$ and $m$, respectively, 45.40 Nl/h of gas (75% of H$_2$ + 25% of N$_2$) coming from the thermocatalytic decomposition of 17.3 g/h of NH$_3$, entering from $m$, and 1970 Nl/h of recycle gas (5% of H$_2$; 94.2% of N$_2$; 0.8% of H$_2$O), coming from condenser F.

From the top of the reducer R$_1$, through $d$, the reaction gas entered cyclone C$_1$, where the entrained dust was separated and discharged through $f$, in an amount of 0.046 kg/h in order to be recycled to R$_1$ or granulated again as desired. The gas leaving the cyclone C$_1$ via line $e$ was partially purged from the system through $g$ (13.15 Nl/h) and partially recycled to the reduction reactor R$_1$ (2142 Nl/h) after having been cooled in condenser F to 4° C and thereby being dehumidified to the desired water content.

The magnetite discharged from R$_1$, through $b$, in an amount of 0.696 kg/h, and cooled to about 300° C, was continuously fed to oxidation reaction R$_2$ (like R$_1$) operating at 300° C, into the bottom of which, through $n$, 2200 Nl/h of air were blown in and, through $p$ 0.706 kg/h of $\gamma$-Fe$_2$O$_3$, constituting the final product, were discharged.

An expanded bed height of 45 cm (1.4 kg), corresponding to an average residence time of about 2 hours, was maintained in R$_2$. The gas leaving R$_2$, through $q$, entered cyclone C$_2$, where dust removal (0.014 kg/h of dusts which were recycled to R$_2$ or added to the production) took place, and the gas was vented from C$_2$ through $r$.

The finished product (0.706 kg/h) was discharged via $p$, and consisted of submicronic acicular $\gamma$-Fe$_2$O$_3$ having a mean axial ratio of 8:1, an intrinsic coercive field of 340 Oersted, a saturation magnetic moment per mass unit of 75 emu/g, a residual magnetic moment, per mass unit, $\sigma_r = 33.0$ emu/g, and a specific surface $(S_{BET}) = 13.4$ m$^2$/g.

The product so obtained proved to be very crumbly and, without any previous grinding, it was directly utilized in the preparation of a magnetic tape having the following magnetic properties:

$H_c = 385$ Oersted; $B_r = 1250$ Gauss; $B_r/B_s = 0.83$.

EXAMPLE 2

The $\alpha$-FeOOH employed in the present example was prepared in the same manner as described above in Example 1, the only exception being that it was not treated with silica.

A laboratory quartz reactor having an inside diameter of 36 mm, electrically heated, was charged with 70 g of $\alpha$-FeOOH thus prepared and granulated into particles of from 74 to 149 microns. The particles were fluidized with 100 Nl/h of nitrogen and heated up to 380° C.

During this step, thorough dehydration of $\alpha$-FeOOH to $\alpha$-Fe$_2$O$_3$ was attained. Keeping a constant temperature of 380° C, the product was reduced to magnetite, operating discontinuously for 2 hours and feeding 100 Nl/h of gas consisting of 80% of H$_2$ and 20% of H$_2$O.

On completion of the reduction, the product was cooled in a nitrogen flow (100 Nl/h) to 260° C. Magnetite was discontinuously oxidized at 260° C for 2 hours, feeding the fluid bed reactor with 115 Nl/h of air. After cooling in an air flow to room temperature, 58 g of submicronic acicular $\gamma$-Fe$_2$O$_3$ were discharged, the characteristics of same being as follows: $H_{ci} = 280$ Oersted, $\sigma_s = 74.6$ emu/g, $\sigma_r = 34.0$ emu/g, specific surface $(S_{BET}) = 12.8$ m$^2$/g.

EXAMPLE 3

Operation here was as in Example 2, but at a reduction temperature of 280° C.

The final product exhibited the following magnetic properties:

$H_{ci} = 270$ Oersted
$\sigma_s = 72.9$ emu/g
$\sigma_r = 32.5$ emu/g
specific surface $(S_{BET}) = 26.6$ m$^2$/g

EXAMPLE 4

Operation here was as in Example 2, but at a reduction temperature of 450° C.

The final product exhibited the following magnetic properties:

$H_{ci} = 230$ Oersted
$\sigma_s = 74.7$ emu/g
$\sigma_r = 33.0$ emu/g
specific surface $(S_{BET}) = 11.4$ m$^2$/g.

What is claimed is:

1. In a process for preparing $\gamma$-Fe$_2$O$_3$ in the form of acicular particles, wherein an aqueous solution of FeSO$_4$ . 7 H$_2$O, kept at 25°–35° C in the presence of air, is treated with alkali until 45–55% by weight of the iron is precipitated in the form of $\alpha$-FeOOH crystallization nuclei and the resulting suspension, at 65°–75° C in the presence of air, is treated with alkali in order to complete the precipitation of iron, thus forming acicular $\alpha$-FeOOH, which is then treated with sodium silicate, dehydrated, reduced to Fe$_3$O$_4$ in a fluid bed reactor and oxidized to $\gamma$-Fe$_2$O$_3$ at 200°–350° C in a fluid bed reactor, the improvement wherein:
   (a) the formation of the acicular $\alpha$-FeOOH in aqueous suspension is carried out with a feeding flow-rate of FeSO$_4$ . 7 H$_2$O of 2.48–12.41 Kg per hour per m$^3$ of reactor;
   (b) the $\alpha$-FeOOH particles are coated with 0.2–2% by weight of SiO$_2$, by bringing the $\alpha$-FeOOH in aqueous suspension obtained as defined in (a) to a temperature ranging from 50° to 90° C, adding Na$_2$SiO$_3$, and adjusting the final pH to 5.5–6.5; and
   (c) the $\alpha$-FeOOH coated with SiO$_2$ is dehydrated and simultaneously reduced to Fe$_3$O$_4$ at a temperature between 480° and 550° C with a reducing gaseous mixture.

2. A process according to claim 1, wherein the fluidizing and reducing gas contains an inert gas in an amount ranging from 70 to 95% by volume.

3. In a process according to claim 1, the improvement further comprising wherein the FeSO$_4$ . 7 H$_2$O in part (a) is an aqueous solution of technical FeSO$_4$ . 7 H$_2$O coming from the production of titanium dioxide pigment via the sulphate process.

4. In a process for preparing $\gamma$-Fe$_2$O$_3$ in the form of acicular particles, wherein an aqueous solution of FeSO$_4$ . 7 H$_2$O, kept at 25°–35° C in the presence of air, is treated with alkali until 45–55% by weight of the iron is precipitated in the form of $\alpha$-FeOOH crystallization nuclei and the resulting suspension, at 65°–75° C, in the presence of air, is treated with alkali in order to complete the precipitation of iron, thus forming acicular $\alpha$-FeOOH, which is then treated with sodium silicate, dehydrated, reduced to Fe$_3$O$_4$ in a fluid bed reactor under fluidizing conditions and oxidized to $\gamma$-Fe$_2$O$_3$ at 200°–350° C in a fluid bed reactor under fluidizing conditions, the improvement wherein:
   (a) the formation of the acicular $\alpha$-FeOOH in aqueous suspension is carried out with a feeding flow-rate of FeSO$_4$ . 7 H$_2$O of 2.48–12.51 Kg per hour per m$^3$ of reactor;
   (b) the $\alpha$-FeOOH aqueous suspension obtained as defined in (a) is subjected to filtration, the filtered product is washed and the $\alpha$-FeOOH particles are coated with 0.2–2% by weight of SiO$_2$, by preparing an aqueous suspension of $\alpha$-FeOOH, bringing the suspension to a temperature ranging from 50° to 90° C, adding NaSiO$_3$, and adjusting the final pH to 5.5–6.5; and
   (c) the $\alpha$-FeOOH coated with SiO$_2$ is dehydrated and simultaneously reduced to Fe$_3$O$_4$ at a temperature between 480° and 550° C with a reducing gaseous mixture.

5. A process according to claim 4, wherein the fluidizing and reducing gas contains an inert gas in an amount ranging from 70 to 95% by volume.

6. In a process according to claim 4, the improvement further comprising wherein the FeSO$_4$ . 7 H$_2$O in part (a) is an aqueous solution of technical FeSO$_4$ . 7 H$_2$O coming from the production of titanium dioxide pigment via the sulphate process.

* * * * *